S. B. MANNING.
Bran Duster.
No. 21,009.
Patented July 27, 1858.
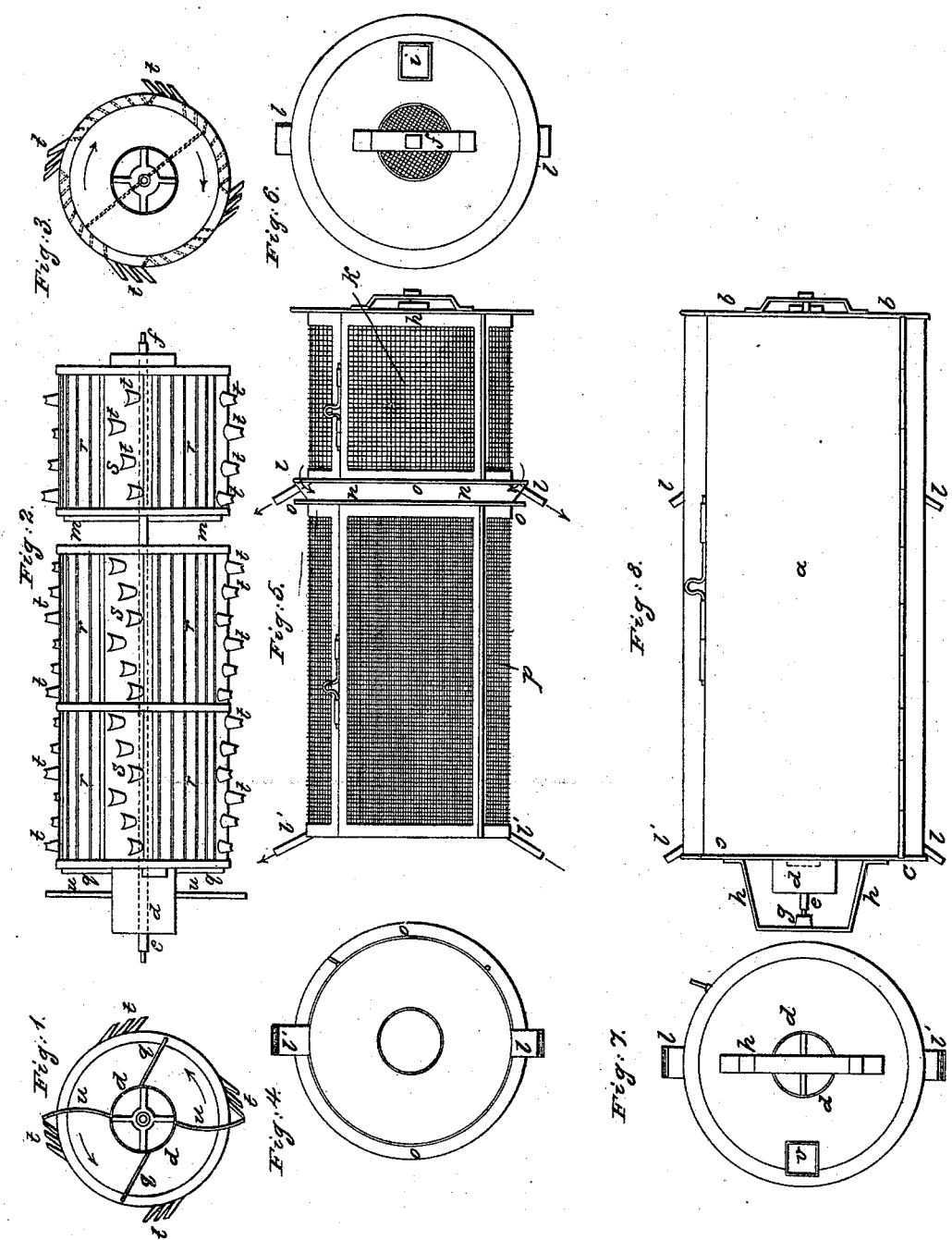

UNITED STATES PATENT OFFICE.

S. B. MANNING, OF ALLEGHENY, PENNSYLVANIA.

BRAN-DUSTER.

Specification of Letters Patent No. 21,009, dated July 27, 1858.

*To all whom it may concern:*

Be it known that I, SAMUEL B. MANNING, of the city of Allegheny, in the county of Allegheny and State of Pennsylvania, have invented a new and useful Improvement in Bran-Dusters; and I do hereby declare the following to be a full, clear, and exact description thereof, reference being had to the annexed drawing, forming part of this specification, in which—

Figure 1, is a representation of the lower end of the fan and beater shaft, separate from the concave or outer casing, and the inner wire gauze covering. Fig. 2, is a longitudinal side view of the fan and beater shaft. Fig. 3, is a transverse section of the fan and beater shaft at right angles to its axis. Fig. 4, is an end view of the bottom of the inner wire gauze covering. Fig. 5, is a longitudinal side view of Fig. 4. Fig. 6, is an end view of the top of the concave or outer casing. Fig. 7 is an end view of the bottom of the concave. Fig. 8, is a longitudinal representation of the concave.

In the several figures like letters of reference denote similar parts of my apparatus.

My invention consists in making my bran-duster in two sections or chambers, one of which is surrounded by a covering of coarse open wire work, which allows everything to pass through except hard lumps of dough or foreign substances which ought to be separated from the feed, and allows nothing to pass into the lower chamber (which is covered by very fine wire gauze) that would injure the gauze by being thrown against it.

To enable others skilled in the art to make and use my improved bran duster, I will proceed to describe its construction and operation.

In the drawings $a$ (Fig. 8) is the concave or outer covering which is a hollow cylinder, which stands perpendicularly at its axis, and is covered at top and bottom by circular plates, $b$, at top, and $c$ at bottom. The top covering $b$, has a circular hole in its center, covered with open coarse wire network, so as to admit the air, and exclude large foreign substances: and the bottom covering $c$, has a similar circular opening at its center, through which passes the drum $d$, attached to the spindle or shaft $e$. The spindle $e$, passes through the center of the concave, turning on a pivot in the cross bar $f$, on the top covering $b$, and in a step $g$, on the bar $h$, which is fastened to the lower covering $c$.

The top covering $b$ has an aperture $i$, (see Fig. 6,) through which the feed is passed from the bolting cloths into the bran duster. The concave $a$ has a door to admit of access to its interior.

Inside of the concave $a$, are the upper and lower chambers of the bran duster. The upper chamber $k$, is a cylinder of wire net work made of coarse wire (about No. 10) the interstices of which are so open as to permit the bran and feed to pass freely through, and yet sufficiently close to prevent the escape of lumps of dough or any foreign substances which may have mixed with the feed in the bolting apparatus. This upper chamber $k$ is united at the top to the upper covering $b$, of the concave, and has a circular bottom, with an opening in the center for the passage of the spindle $e$: and also an opening at either side to the spouts $l$ $l$, through which the substances left in the upper chamber are discharged by the revolution of the scrapers $m$ $m$, which are attached to the spindle $e$, and revolve close to the surface of the bottom of the upper chamber $k$. The diameter of the upper and lower chambers is less than that of the concave, and being concentric with it, leaves a space all around, between the concave and the wire gauze chambers. A shallow circular funnel $n$ (see Fig. 5,) united to the flange $o$, surrounds the top of the lower wire gauze chamber $p$, the top of the funnel $n$, and the outer edge of the flange $o$, being united to and touching the concave $a$ at all points of their circumference, to prevent the feed, as it passes through the wire covering of the upper chamber, $k$, passing outside of the lower chamber $p$: or elsewhere than to the interior of the lower chamber.

The lower chamber $p$, is supported at top by the flange $o$, which as before stated is fastened to the concave $a$. This lower chamber $p$, is cylindrical, as above described, and like the upper chamber in construction, except that it is longer or deeper and made of gauze network of very much finer wire than the upper chamber, the wire used being about No. 60 or 70, and the interstices so fine, that nothing but the fine flour can pass through it, into the concave; this lower chamber $p$, like the upper one, has a bottom, through the center of which the spindle $e$, revolves, on which bottom a scraper $q$, (see Fig. 2,) revolves with the spindle to deliver the feed which settles on the bottom through the spouts $l'\ l'$ (see Fig. 5). The bottom of the lower chamber is parallel to the bottom or lower covering $c$, of the concave, but with a sufficient space between them to allow of the deposit of flour on the bottom $c$, of the concave.

Attached to the spindle $e$, are the cylindrical heaters composed of slats or strips $r\ r$, &c., placed in a circle parallel to the axis of the shaft, and equidistant therefrom. These slats are placed obliquely, so that as they revolve inside of the wire chambers they will drive the feed as it falls through the machine outward against the wire gauze covering of the chambers. There are also either attached to the oblique slats $r$, $r$, of the heaters, or to strips $s$, $s$, placed at regular intervals around the cylinder formed by the oblique slats, curved teeth $t\ t$, &c., which project from the strips at the same angle as that at which the slats $r\ r$ are set. These teeth are designed to act as beaters to strike the feed as it passes through the machine, breaking up the particles of flour which adhere to the bran, and separating it therefrom, so that it may be driven out into the concave. A scraper $u$, attached to the drum $d$, and which revolves with the spindle $e$, rests on the bottom or lower cover $c$ of the concave $a$, and discharges the flour from the concave through the aperture $v$.

The operation of my bran duster is as follows: The feed as it passes from the bolting apparatus is apt to be mixed with hard lumps of dough, formed by the moisture of the flour, and also with foreign substances, such as tacks, with which the bolting cloths are fastened. These substances are very apt to break the very fine gauze net work covering of the bran duster, and thus of course destroys the ability of the machine by allowing the feed and foreign matter to pass into the concave with the flour, besides destroying a very expensive part of the machinery of flouring mills. To avoid this serious cause of expense, and loss of time in repairing the machinery, I have introduced an upper chamber in my bran duster. The feed passes from the bolting apparatus through the opening $i$ (Fig. 6) in the upper cover of the concave, inside the coarse wire covering of the chamber $k$. Hhere the beating teeth $t\ t$, &c., separate the lumps of dough, &c., from the feed, and also break up and separate the particles of flour which the bolting cloths have left with the bran and drive it all against the wire covering. This wire work is so open as to allow all the feed and flour to pass through into the concave, whence it falls through the funnel $n$ (see Fig. 5) into the interior of the lower chamber $p$, while the lumps of dough, tacks and other foreign substances, are retained in the upper chamber, until delivered through the spouts $l\ l$, clear of the whole machine. The feed and flour falling into the inner chamber $p$ are acted on by the beating teeth $t'\ t'$, and slats $r'\ r'$, &c., the flour being more separated from the bran &c., and all being driven against the fine gauze covering of the lower chamber $p$, a separation ensues, the flour passing out into the concave $a$, where it settles on the bottom $c$ and is delivered through the aperture $v$, while the feed left inside the lower chamber $p$ is delivered by the scraper $q$, through the spouts $l'\ l'$.

The action of the teeth $r\ r$ and $r'\ r'$ in the upper and lower chambers is such that it separates a great quantity of flour from the feed, which would otherwise pass off with the feed and be lost as flour.

I do not claim as new the use of the wire gauze covering, nor the slats $r'\ r'$, nor the concave $a$, but What I do claim as my improvement, and desire to secure by Letters Patent, is—

The use of a separate chamber covered with coarse wire net work, in addition to and in combination with the ordinary chamber covered with fine gauze wire net work, arranged substantially in the manner and for the purposes hereinbefore set forth.

In testimony whereof I have hereunto set my hand this fifteenth day of April anno Domini 1858.

S. B. MANNING.

Witnesses:
 MARTIN G. CUSHING,
 L. P. STONE.